Nov. 29, 1949  C. W. CHESTER  2,489,481
EXHAUST PIPE EXTENSION
Filed May 6, 1946  2 Sheets-Sheet 1
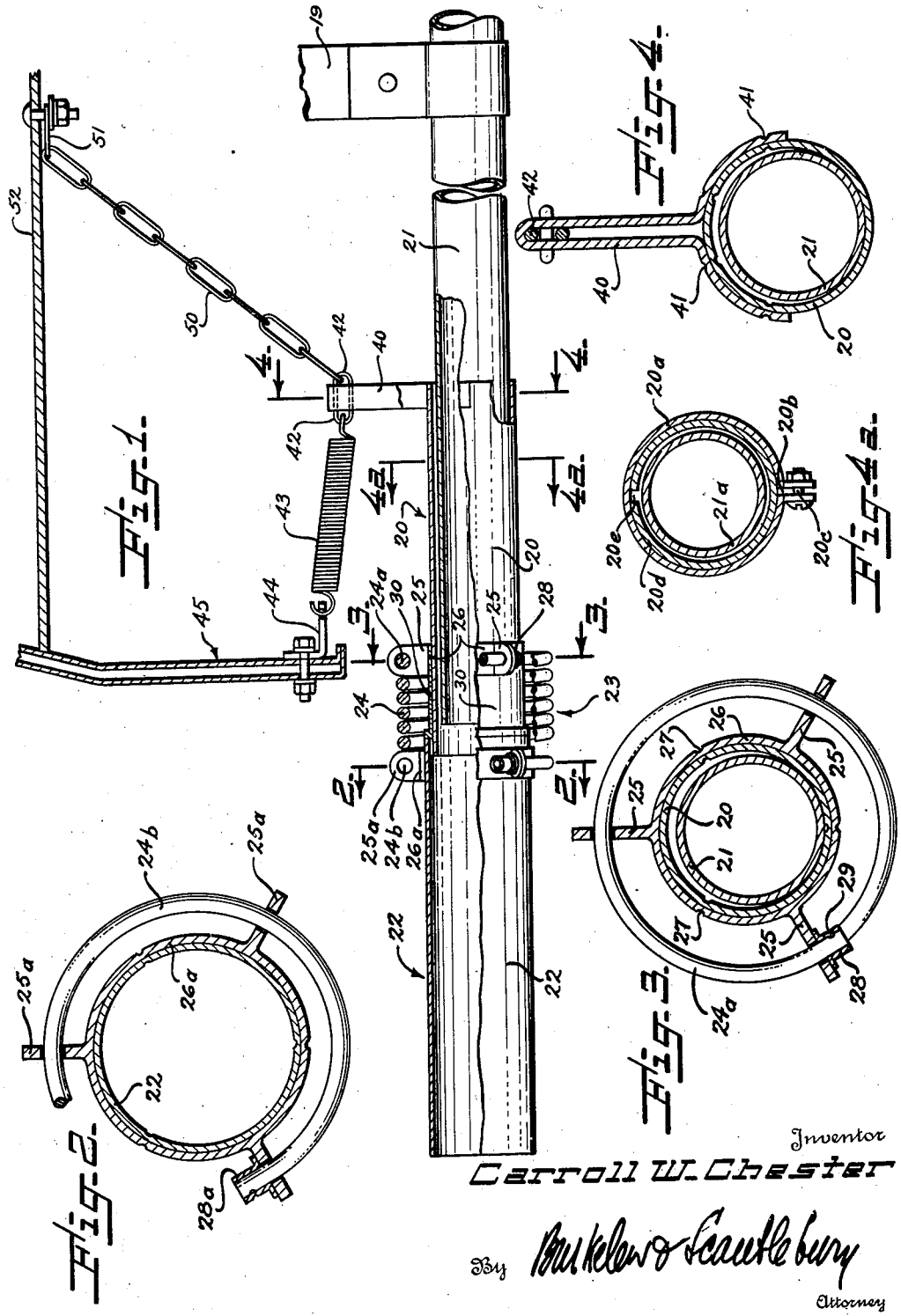
Inventor
Carroll W. Chester
By Buckelew & Scantlebury
Attorney

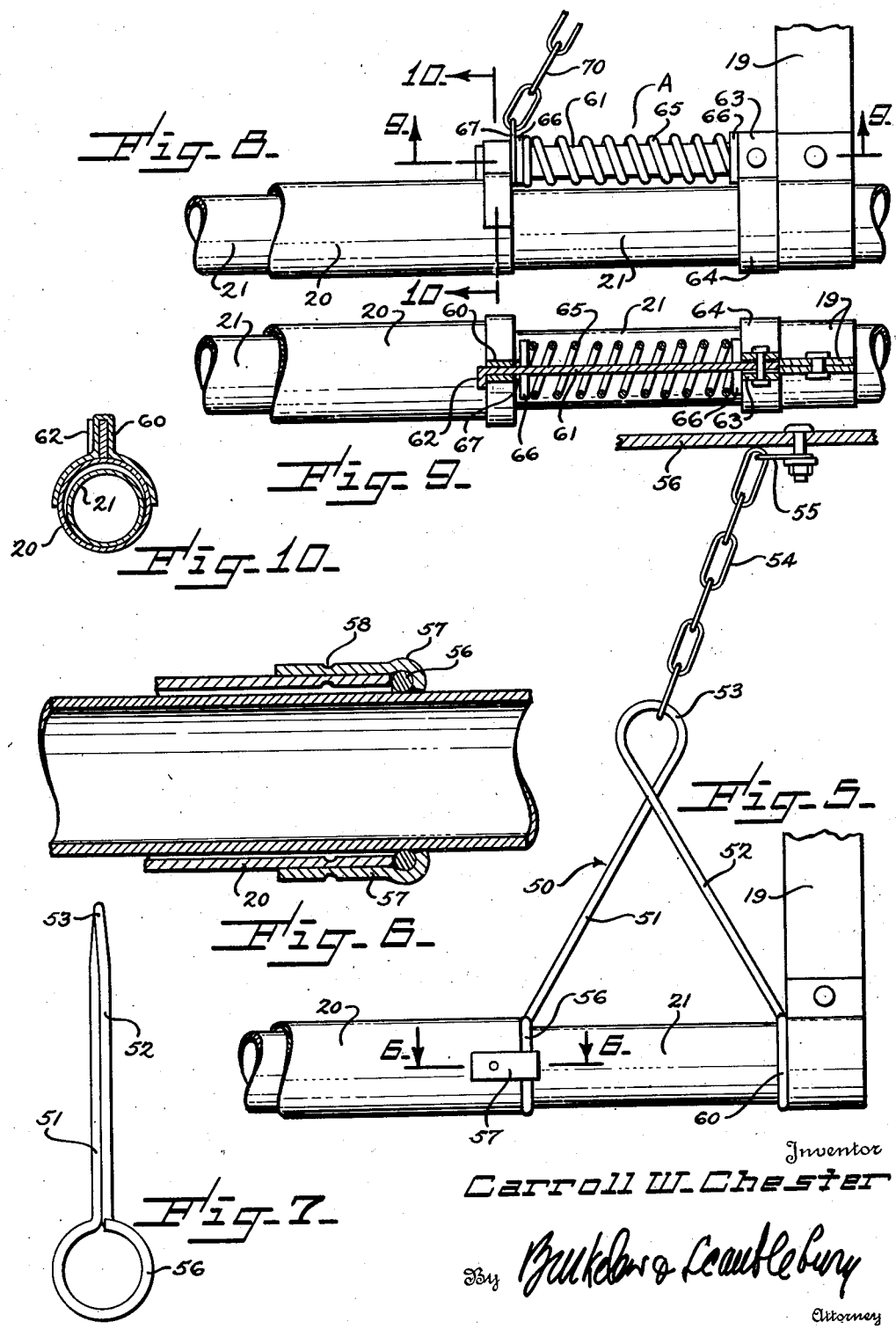

Patented Nov. 29, 1949

2,489,481

UNITED STATES PATENT OFFICE 2,489,481

EXHAUST PIPE EXTENSION

Carroll W. Chester, Los Angeles, Calif.

Application May 6, 1946, Serial No. 667,615

10 Claims. (Cl. 248—54)

This invention relates to extensions for exhaust pipes, or tail pipes, of automobiles; and the general purpose of the invention is to provide a simple and effective extension which will continue the exhaust pipe rearwardly past the rear bumper or other rearmost structure of an automobile, and at the same time be proof against damage to itself and also protect the exhaust pipe from damage.

In most if not all automobiles the exhaust pipe extends rearwardly to a point somewhat forward of the rear bumper, or of the rearmost part of the automobile frame or body structure. It is desirable to extend the pipe rearwardly as far as possible, so as to eject the exhaust fumes as far rearward as may be; but at the same time the exhaust pipe cannot or should not extend rearwardly beyond the rearmost structure, which is usually the rear bumper, so that the pipe is protected by the bumper against injury. And it is very important to protect the exhaust pipe against injury, because any breaks allowing leakage at any point in the exhaust conduit beneath the automobile are extremely dangerous; and if the exhaust pipe is injured in such manner as to cause stoppage or constriction, that also is extremely dangerous.

It is desirable to effectively extend the exhaust conduit as far rearwardly as is possible or practicable, not only for the ejection of the exhaust fumes as far as practicable behind the automobile, to minimize the chance of exhaust gas seeping into the car; but also to protect the finish of the car structure from the deterioration which is caused by the constant exposure of the finish to exhaust fumes.

The present invention is in the nature of improvement upon my similar invention which is set out in my application entitled Exhaust pipe extension, filed March 23, 1945, Ser. 584,309. The features of improvement will be pointed out herein, and are the particular subject-matter of the claims herein. In common with my invention as set out in my prior application, the present invention provides an extension for the exhaust pipe which effectively extends the exhaust conduit to a point well behind the rearmost part of the automobile structure; and it provides an extension structure which is proof against damage to itself, and which also protects the exhaust pipe proper from damage, in case the extension is contacted or struck either in a longitudinal direction or in a transverse direction. The nature of the improvements which comprise the present invention will be best understood from the following detailed description of preferred forms embodying the invention, and which are illustrated in the accompanying drawings in which Fig. 1 is a diagrammatic elevation, with parts in section, showing one form of my invention applied to a typical automobile structure;

Fig. 2 is an enlarged cross section on line 2—2 of Fig. 1;

Fig. 3 is an enlarged cross section on line 3—3 of Fig. 1;

Fig. 4 is an enlarged cross section on line 4—4 of Fig. 1;

Fig. 4a is a section taken as indicated by line 4a—4a on Fig. 1, but showing a modified construction;

Fig. 5 is a fragmentary side elevation showing modifications in the device of Fig. 1;

Fig. 6 is an enlarged detail section taken as indicated by line 6—6 on Fig. 5;

Fig. 7 is an end elevation of the spring which is utilized in the form of Fig. 5;

Fig. 8 is a fragmentary side elevation showing other modifications;

Fig. 9 is a section taken as indicated by line 9—9 on Fig. 8, and

Fig. 10 is a detail section taken as indicated by line 10—10 on Fig. 8.

In common with my invention as shown in my said prior application, my present improved form of the invention embodies an extension unit which in its normal position projects rearwardly from the rigid exhaust pipe to a point preferably beyond the rearmost part of the automobile structure. This extension unit is so constructed as normally to form a substantially fluid-tight extension conduit for the exhaust gases, but is so formed and so mounted that its projecting extension portion is laterally flexible to protect it from any blows or pressure in a lateral direction, and is also longitudinally movable in a forward direction, telescoping over the rear end of the exhaust pipe, so as to relieve the rigid exhaust pipe of longitudinal stresses in case longitudinal force or pressure is applied to the extension.

In my prior application I have, in the specific illustrative design shown there, shown the extension unit as being mounted and supported directly upon and by the exhaust pipe itself with regard to the longitudinal support or mounting of the unit. With such a mounting, longitudinal forces applied to the extension are, to a certain extent at least, transmitted to the exhaust pipe itself. And, although those longitudinal forces are relatively small, it is desirable that even those forces shall be transmitted to parts of the automobile frame or body structure directly rather than through the exhaust pipe itself. My present invention provides for so transmitting those forces so that they are not applied at all to the exhaust pipe.

In my prior application I have shown several varying forms of the extension unit, and my present improvements may be applied to any of those illustrative forms, or to any similar form of extension. However, for the purpose of illustration of the present improvement invention I have shown my present improvements applied typically to that form of the extension unit which at present I find to be the preferable form.

Thus, in Fig. 1 of the drawings I show an extension unit which in essentials is made up of a tubular member 20 which fits over and is slidable upon the rear end portion of the rigid exhaust pipe 21; and rear tubular conduit 22 which extends rearwardly from the rear end of sliding tube 20; and a flexible elastic connection member 23 interconnecting the tubular members 20 and 22, substantially incompressible longitudinally but laterally flexible.

As shown in detail in the drawings, member 23 may preferably be in the nature of a closely coiled helical spring 24 which is preferably so wound as normally to have its coils in mutual contact. The inner end of this spring is rigidly mounted upon sliding tube 20 by having its innermost convolution 24a pass through several ears 25 which either project from tube 20 or project from a ring 26 which may be set on tube 20 by spot welding or by local indentation such as indicated at 27. To prevent rotational displacement of the spring in the mounting ears a collar or any equivalent member 28 may be set on the end of the spring by local indentation or welding as at 29. The outer end of spring 24 is similarly connected to extension tube 22 by having its rearmost convolution 24b passed through projecting ears 25a which are mounted on tube 22 or on the ring 26a which is rigidly mounted on tube 22, the end of the convolution being provided with the retaining collar 28a. Spring 24, being thus rigidly attached at its two ends to the two tubes 20 and 22 will normally hold the outer tube 22 in alignment with the inner sliding tube 20, but will allow lateral swinging deflection of the outer tube 22 if lateral pressure is applied to it. The inner or forward end of tube 22 may somewhat overlap the rear end of tube 20, and is of sufficiently larger diameter than tube 20 to allow free lateral deflection of the rear end of 22. Tube 20 may be provided with a stop collar 30 rigidly set on it in such a position that spring 24 normally holds the forward or inner end of tube 22 up against that stop collar. It is preferred however not to use the stop collar as shown at 30, in which case the forward end of tube 22 occupies substantially the position shown in Fig. 1, when the coils of spring 24 are closed.

The foregoing described and illustrative form of the extension unit is, except for the optional addition of stop collar 30, essentially the same as one form of the unit set out in my prior application. In that application the yielding or resilient means which opposes forward movement of the extension unit on the exhaust pipe is shown generally in the form of a compression spring surrounding the exhaust pipe and having one end attached to the exhaust pipe and the other end applied to the sliding tube 20 to resiliently oppose that forward sliding movement on the pipe. In my present improved invention I provide such resilient means to act between sliding tube 20 and other structural frame or body parts of the automobile; and I also provide, in connection with the resilient means a support for the projecting part of the exhaust pipe and for the extension unit.

Thus, in Fig. 1 I show the forward end of sliding tube 20 provided with an upwardly extending bracket or ear 40 preferably formed as shown in Fig. 4 and secured to the forward end of tube 20 by spot welding as indicated at 41. As shown in Fig. 4 this bracket may be formed by a piece of strap metal doubled upon itself, and a link 42 may be passed through the upper end of the bracket. A coiled tension spring 43 is shown as having its forward end connected with the rear end of link 42, and having its rear end hooked through a bracket 44. Bracket 44 is here illustrated as being mounted upon an element 45 which may be either a part of the rear bumper structure of the automobile, or a part of the framing or body structure of the automobile forward of the bumper. Spring 43 is of such length that, contracted, it will normally hold tube 20 of the extension unit in a rearward position such as shown in Fig. 1, and is extensible to allow the whole extension unit to slide forwardly upon the exhaust pipe far enough to allow tube 22 to move forward to a position where it is wholly ahead of the bumper.

As shown in Fig. 1 a chain 50 or similar element may have one end attached to the forward end of link 42 and extend upwardly and forwardly to be attached at 51 to a part 52 which represents any suitable or available element of the automobile frame or body structure. In the normal rearward position of the extension unit chain 50 is pulled taut by spring 43 and thus tends to limit the rearward position of the extension unit and also to pull upwardly on it to support the unit and to support that part of the exhaust pipe 21 which extends rearwardly of the normal pipe mounting bracket 19. Tension spring 43, extending rearwardly and also somewhat upwardly (it may extend upwardly at a sharper angle than shown in Fig. 1) also tends to support the extension unit and the exhaust pipe, and tends to support them whether the unit is in its rearmost position shown in Fig. 1 or is moved forwardly of that position.

It is preferred that the sliding tube fit the exhaust pipe fairly closely, just so long as it is freely slidable. Exhaust pipes vary in size; and to make a given tube 20 fit properly upon a range of exhaust pipe sizes the arrangement shown in Fig. 4a may be used. In that figure the sliding tube 20a is shown as being longitudinally split at 20b. Its normal condition will be with the split somewhat widely open, but closeable by the clamping bolt or bolts 20c. Such a split tube, adjustable in diameter by the clamping bolt, will fit exhaust pipes of relatively larger sizes. To properly fit relatively smaller sizes, such as the pipe shown at 21a, a longitudinally split liner 20d is inserted as shown. The liner also may have its split 20e somewhat wide open, to be closed down to the proper pipe fitting size by clamping the outer tube 20a down in size.

Fig. 5 shows a modification which may be applied to the devices shown in Fig. 1. In Fig. 5 the exhaust pipe is again shown at 21 and its mounting bracket at 19, and the sliding sleeve of the extension unit is shown at 20. The remainder of the structure of the extension unit may be assumed to be the same as that shown in Fig. 1, with or without the modification of Fig. 4a. A spring 50 is shown essentially in the form of a hair-pin spring, or as a spring with two legs 51 and 52 which are preferably crossed at the upper end to form an eye 53. A supporting chain 54 has its lower and rearward end connected to eye 53, and its upper and forward end connected at 55 with a part 56 which may be any suitable part of the automobile frame or body structure. The lower end of rearward spring leg 51 is looped as shown at 56 and is fixedly connected with the forward end of tube 20 as for instance as shown in Figs. 5 and 6 where loop 56 is shown as abutting the forward end of tube 20 and held against that end by a pair of clips 57 which are spot welded as indicated at 58 to tube 20. The other or forward leg 52 of the spring may be similarly connected to some part of the automobile structure, for instance to pipe-supporting bracket 19 where it surrounds exhaust pipe 21. Or, preferably, it may have an eye 60 which simply surrounds the exhaust pipe forward of bracket 19 and abuts the bracket at its rear side as illustrated. Bracket 19, particularly if sufficiently strongly made and connected with the automobile frame structure, may be considered as a part of the automobile frame for the purpose of my invention.

The primary purpose of spring 50 is of course to yieldingly resist forward movement of sliding tube 20 and of the whole extension unit. The chain 54 or similar supporting element limits the rearward position of tube 20 on the exhaust pipe and also supports the tube 20 and the extending part of the exhaust pipe when the extension unit is in its rearward position.

In general, the spring or other resilient member which resists forward movement of the extension unit with reference to the exhaust pipe may be either a tension spring or a compression spring. Fig. 1 shows by way of illustration a tension spring which acts by resilient extension when the extension unit moves forwardly. Fig. 8 shows a typical arrangement in which a compression spring may be utilized between tube 20 and a suitable part of the automobile framing as for instance the pipe-supporting bracket 19. In Figs. 8, 9 and 10 I show the rear end of sliding tube 20 equipped with an upstanding apertured ear 60 through which a longitudinal guide bar 61 extends. The rearward end of bar 61 is bent to form a stop at 62 limiting the rearward movement of tube 20. The forward end of guide bar 61 is rigidly attached to an upstanding ear, or between upstanding ears 63, on a collar 64 which surrounds exhaust pipe 21 and abuts forwardly against the pipe-supporting bracket 19. That supporting bracket 19 may here, as in Fig. 5, either be the usual pipe-supporting bracket or may be a special one for the purposes of my extension; or, in fact, may be any other suitably located part of the automobile structure or any bracket affixed thereto. Compression spring 65 surrounds guide bar 61 between ears 63 and ear 60, its ends preferably bearing directly on interposed washers 66. And between the rearward washer 66 and the ear 60 on tube 20, a link 67 may be interposed to surround guide bar 61 and to form the means of attachment of the lower end of supporting chain 70 which extends upwardly and forwardly to have its upper end secured to any suitable or convenient part of the automobile structure as shown in either Fig. 1 or Fig. 5.

I claim:

1. In combination with an automobile which has a rearwardly extending exhaust pipe, an exhaust pipe extension comprising a tubular unit fitted slidingly at its forward end over the rear end of the exhaust pipe, and resilient means acting between the forward portion of the unit and the automobile frame structure opposing forward sliding movement of the unit with relation to the exhaust pipe.

2. In combination with an automobile which has a rearwardly extending exhaust pipe, an exhaust pipe extension comprising a tubular unit fitted slidingly at its forward end over the rear end of the exhaust pipe, and resilient means acting between the forward portion of the unit and the automobile frame structure opposing forward sliding movement of the unit with relation to the exhaust pipe, and means associated with said resilient means whereby the latter exerts an upward thrust on the unit to support it and the exhaust pipe.

3. In combination with an automobile which has a rearwardly extending exhaust pipe, an exhaust pipe extension comprising a tubular unit fitted slidingly at its forward end over the rear end of the exhaust pipe, resilient means acting between the forward portion of the unit and the automobile frame structure opposing forward sliding movement of the unit with relation to the exhaust pipe, and means acting between the automobile frame and the unit to support the latter and the exhaust pipe.

4. In combination with an automobile which has a rearwardly extending exhaust pipe, an exhaust pipe extension comprising a sleeve slidingly fitted over the rear end portion of the exhaust pipe, a longitudinally incompressible but laterally flexible tubular unit attached to the rear end of the sleeve and extending rearwardly therefrom, and resilient means acting between the sleeve and the automobile frame structure opposing forward sliding movement of the sleeve with relation to the exhaust pipe.

5. In combination with an automobile which has a rearwardly extending exhaust pipe, an exhaust pipe extension comprising a sleeve slidingly fitted over the rear end portion of the exhaust pipe, a longitudinally incompressible but laterally flexible tubular unit attached to the rear end of the sleeve and extending rearwardly therefrom, and resilient means acting between the sleeve and the automobile frame structure opposing forward sliding movement of the sleeve with relation to the exhaust pipe, and means associated with said resilient means whereby the latter exerts an upward thrust on the unit to support it and the exhaust pipe.

6. In combination with an automobile which has a rearwardly extending exhaust pipe, an exhaust pipe extension comprising a sleeve slidingly fitted over the rear end portion of the exhaust pipe, a longitudinally incompressible but laterally flexible tubular unit attached to the rear end of the sleeve and extending rearwardly therefrom, resilient means acting between the sleeve and the automobile frame structure opposing forward sliding movement of the sleeve with relation to the exhaust pipe, and means acting between the automobile frame and the unit to support the latter and the exhaust pipe.

7. In combination with an automobile which has a rearwardly extending exhaust pipe, an exhaust pipe extension comprising a tube slidingly fitted over the rear end portion of the exhaust pipe, an extension tube with its forward end fitted loosely over the rear end of the sliding tube, a flexible connection between the two tubes comprising a closely coiled helical spring spacedly surrounding both tubes and having its ends secured respectively to the two tubes, and resilient means acting between the sliding tube and the automobile frame structure opposing forward sliding movement of said tube on the exhaust pipe.

8. In combination with an automobile which has a rearwardly extending exhaust pipe, an exhaust pipe extension comprising a tube slidingly fitted over the rear end portion of the exhaust pipe, an extension tube with its forward end fitted loosely over the rear end of the sliding tube, a flexible connection between the two tubes comprising a closely coiled helical spring spacedly surrounding both tubes and having its ends secured respectively to the two tubes, and resilient means acting between the sliding tube and the automobile frame structure opposing forward sliding movement of said tube on the exhaust pipe, said resilient means embodying a tension spring extending rearwardly and upwardly from a point of attachment to said tube to a point of attachment to the frame structure.

9. In combination with an automobile which has a rearwardly extending exhaust pipe, an exhaust pipe extension comprising a tube slidingly fitted over the rear end portion of the exhaust pipe, an extension tube with its forward end fitted loosely over the rear end of the sliding tube, a flexible connection between the two tubes comprising a closely coiled helical spring spacedly surrounding both tubes and having its ends secured respectively to the two tubes, resilient means acting between the sliding tube and the automobile frame structure opposing forward sliding movement of said tube on the exhaust pipe, and flexible means connected between said tube and the frame structure to support said tube and the exhaust pipe.

10. In combination with an automobile which has a rearwardly extending exhaust pipe, an exhaust pipe extension comprising a tubular unit slidingly fitted over the rear end portion of the exhaust pipe, and resilient means acting between the forward portion of the unit and the automobile frame structure opposing forward sliding movement of said unit on the exhaust pipe, said resilient means comprising a spring of general hair-pin shape having one leg engaging said unit and the other leg engaging a part of the automobile frame structure, and means for supporting said unit and the exhaust pipe comprising a flexible supporting member attached to the bend of the spring and to the automobile frame structure.

CARROLL W. CHESTER.

REFERENCES CITED

The following references are of record in the file of this patent:

UNITED STATES PATENTS

| Number | Name | Date |
|---|---|---|
| 1,597,813 | Matthes | Aug. 31, 1926 |
| 2,267,431 | Steensen | Dec. 23, 1941 |

FOREIGN PATENTS

| Number | Country | Date |
|---|---|---|
| 682,666 | Germany | Sept. 28, 1939 |